No. 647,104. Patented Apr. 10, 1900.
W. MILLER.
FLUE CUTTER.
(Application filed Jan. 18, 1900.)
(No Model.) 2 Sheets—Sheet 1.
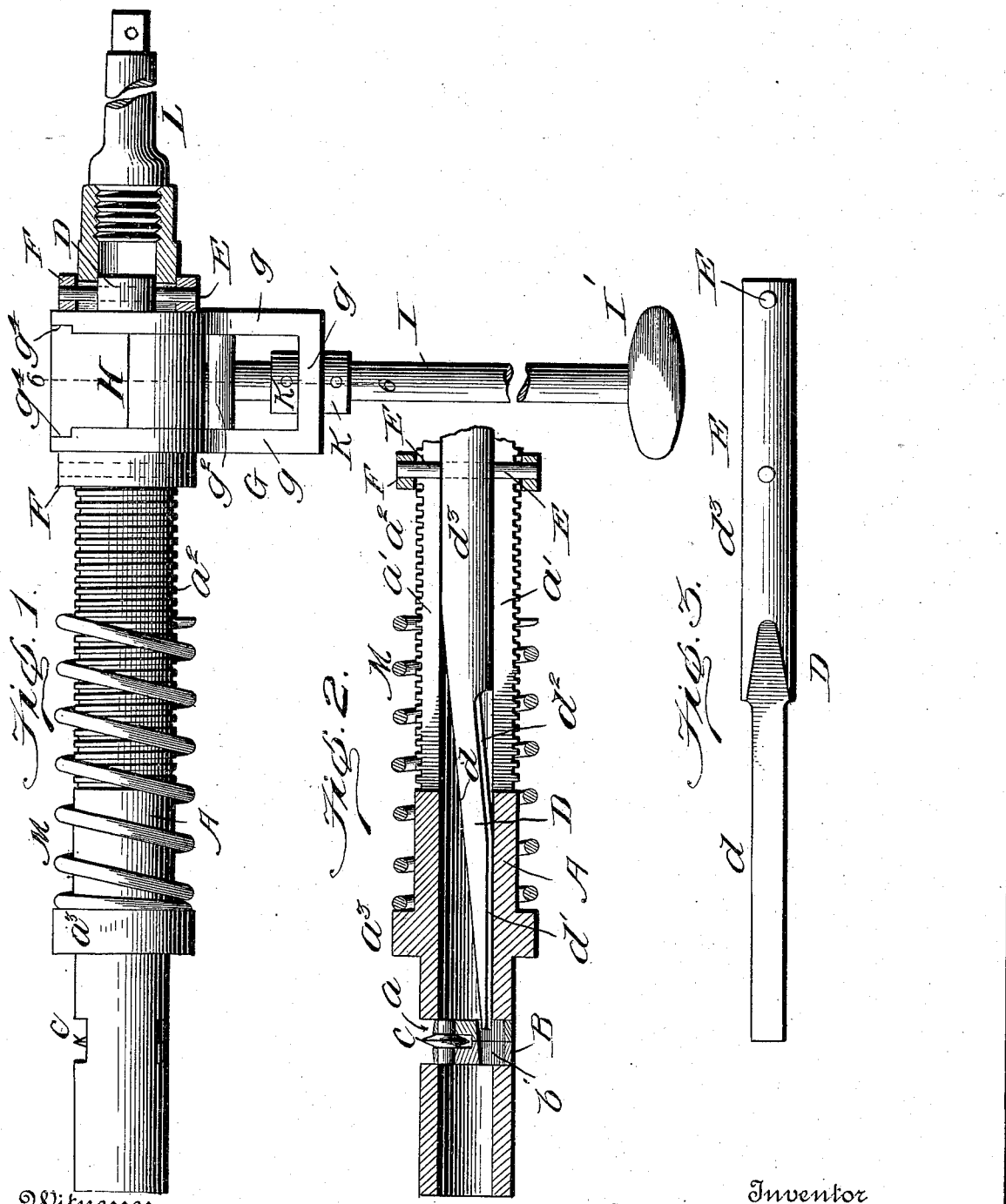

No. 647,104.
W. MILLER.
FLUE CUTTER.
(Application filed Jan. 18, 1900.)
(No Model.)
Patented Apr. 10, 1900.
2 Sheets—Sheet 2.
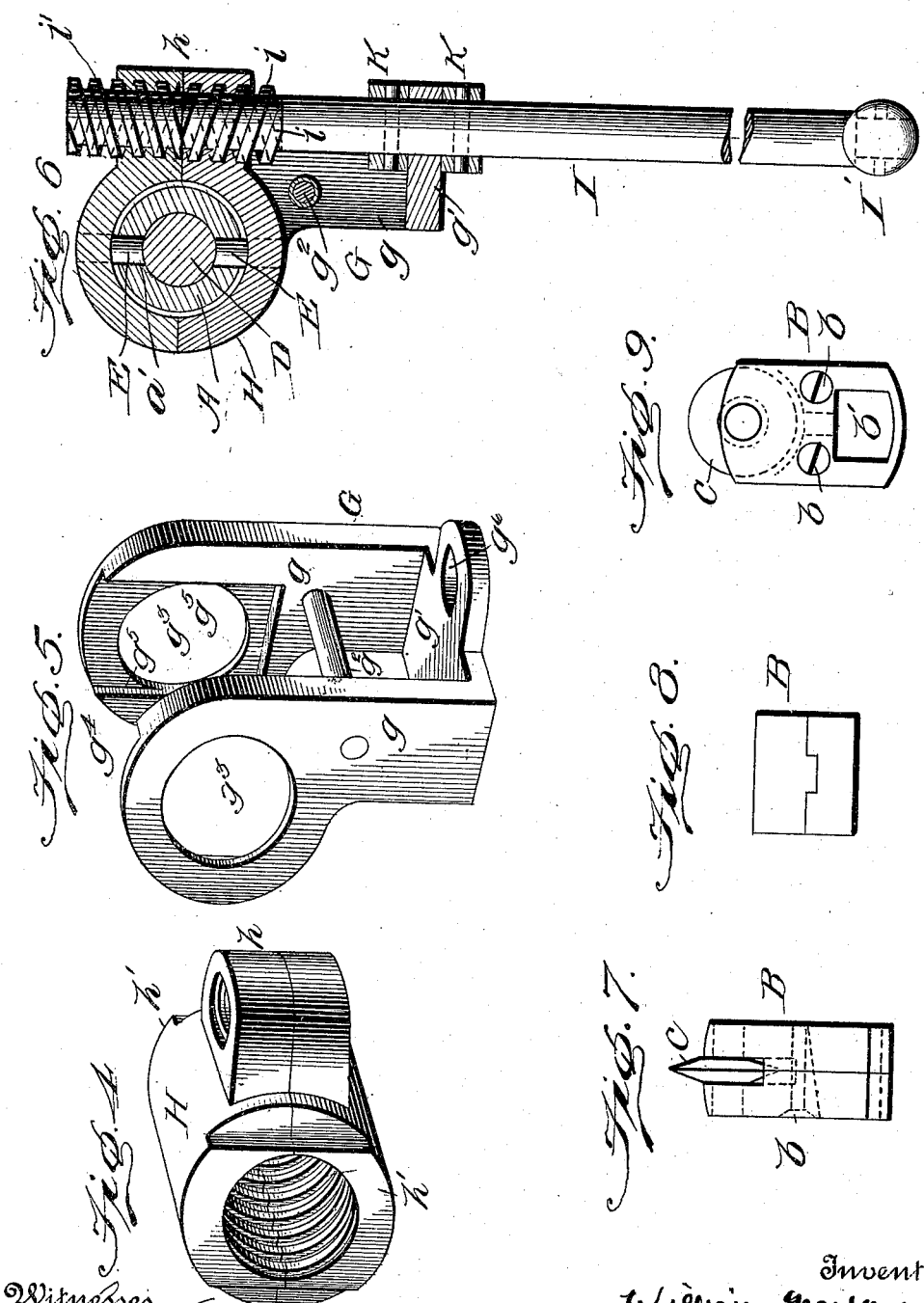
Witnesses
Inventor
William Miller
By
Attorney

UNITED STATES PATENT OFFICE.

WILLIAM MILLER, OF SPRINGFIELD, MISSOURI.

FLUE-CUTTER.

SPECIFICATION forming part of Letters Patent No. 647,104, dated April 10, 1900.

Application filed January 18, 1900. Serial No. 1,855. (No model.)

*To all whom it may concern:*

Be it known that I, WILLIAM MILLER, a citizen of the United States, residing at Springfield, in the county of Greene and State of Missouri, have invented certain new and useful Improvements in Flue-Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to tools for cutting off pipe, and it is especially intended for cutting boiler flues or tubes. I am aware that many tools have been designed for this purpose; but my invention aims to improve upon their construction in certain particulars hereinafter set forth, and particularly pointed out in the claims.

In the drawings, Figure 1 is a side elevation, partly broken away and in section, of an inside pipe-cutting tool embodying my improvements. Fig. 2 is a longitudinal section of a portion of the same. Fig. 3 shows a plan view of the wedge for forcing out the cutter-carrier. Fig. 4 is a perspective view of the two-part nut for feeding the wedge. Fig. 5 is a perspective view of the carriage for said nut. Fig. 6 is a cross-sectional view of the tool, taken on the line 6 6, Fig. 1. Fig. 7 shows the cutter and its carrier on an enlarged scale. Fig. 8 is a bottom plan view of the same, and Fig. 9 is a side elevation of the same.

The body A of the tool is tubular, having a transverse slot $a$ near one end for the reception of the cutter-carrier B. This carrier is preferably made in two parts, united by a tongue and groove and bolts $b$, as shown most clearly in Figs. 7, 8, and 9. The upper portion of each part is cut away to form a slot in which is received the cutter-wheel C, journaled in bearings in the carrier and projecting beyond the end of the carrier. The carrier is small enough to be capable of being withdrawn entirely into the body of the tool, as shown in Fig. 1; but in order to force it outwardly, so as to carry the cutter beyond the periphery of the tubular body A and enable it to operate upon the inside of a flue, means are provided for giving the carrier a movement transverse to the body A. I prefer to use for this purpose a wedge D, slidable lengthwise in the tubular body A and passing through a transverse hole $b'$ in the carrier. The upper side $d$ of the wedge is inclined and bears against the upper side of the hole $b'$, so as to move the carrier B transversely as the wedge is fed forward. The lower side of the wedge is parallel with its line of movement for a portion $d'$ of its length and rests against one side of the interior of the body A. For the rest of its length $d^2$ it is parallel with the upper inclined side $d$ in order not to become jammed in the hole $b'$ in the carrier. The shank $d^3$ of the wedge is preferably round to fit the interior of the body A.

In order to feed the wedge, I prefer the mechanism shown, consisting of one or more arms E, extending from the shank of the wedge radially through one or more longitudinal slots $a'$ in the body A and engaged by a nut meshing with screw-threads $a^2$, formed upon the exterior of said body for a portion of its length. By turning the nut or by holding it still while the body is rotated the wedge can be fed lengthwise in the body. To enable this to be done to the best advantage, I provide two sets of arms E, as shown, and mount the nut between them, the arms carrying collars F, encircling the body A and receiving between them the carriage G, in which the nut is held. The carriage consists of two parallel side pieces or jaws $g$, connected at one end by an end plate $g'$ and at some intermediate point by a cross-bar $g^2$. The jaws have holes $g^3$ to fit over the screw-threaded portion of the body A, and the inside of each jaw around said hole is cut out to form a recess $g^4$ with straight parallel walls $g^5$.

The nut H has on one side a perforated lug $h$ and is divided into halves on a diametrical plane through said lug. The ends of the nut have projections $h'$, provided with straight parallel sides adapted to enter snugly with a sliding fit between the side walls $g^5$ of the recesses $g^4$ in the jaws of the carriage.

The end plate of the carriage has a hole $g^6$ to receive the shank I of a screw which has one half cut with a left-hand thread $i$ and the other half with a right-hand thread $i'$ to mesh, respectively, with similar threads in the two halves of the lug $h$ on the nut. The shank I is provided with collars K on each side of the end plate $g'$ or with some equivalent device to prevent its endwise movement in said plate. At its outer end the shank may have a handle $I'$.

Into the end of the body A is screwed or otherwise secured a rod or shank L to be engaged by any suitable wrench for rotating the tool and causing the cutter to act.

On the body near the cutter is a collar $a^3$, against which abuts a helical spring M, encircling the body and extending part way along the screw-threads $a^2$.

In operation the cutter is withdrawn into the body and the tool is inserted into the flue or tube to be cut. Supposing the parts to be as shown in Fig. 1, the body A is then rotated while the carriage G is held still. This causes the nut to travel along the body, carrying with it the wedge D and slowly forcing the cutter out against the inside of the flue at the same time that it is being rotated with the body A. As the nut progresses toward the collar $a^3$ one of the collars F comes in contact with the free end of the spring M and gradually compresses it. When the flue has been cut through and it is desired to withdraw the wedge and allow the cutter-carrier to withdraw into the body A in order to avoid the necessity of running the nut back on the screw-threads $a^2$, it is only necessary to give the spindle I a turn or two, which, through the action of the right and left hand threads $i\ i'$, separates the halves of the nut, sliding them radially away from the body in the recesses $g^4$. As soon as the nut is out of engagement with the threads the spring M throws the carriage, nut, and wedge back to their original positions at the outer end of the body. A reverse turning of the spindle I will then close the nut upon the threads again, ready for another operation.

Having thus described my invention, what I claim, and desire to secure by Letters Patent, is—

1. A pipe-cutting tool, having a tubular body externally screw-threaded and provided with transverse and longitudinal slots, a cutter movable in the transverse slot, a wedge inside the body for moving said cutter, arms on said wedge projecting through the longitudinal slots, and a two-part nut meshing with said screw-threads and engaging with said arms.

2. A pipe-cutting tool, having a tubular body externally screw-threaded and provided with transverse and longitudinal slots, a cutter movable in the transverse slot, a wedge inside the body for moving said cutter, arms on the wedge projecting through said longitudinal slots, a two-part nut meshing with said screw-threads and engaging with said arms, and means for opening and closing the nut upon the screw-threads.

3. A pipe-cutting tool, having a tubular body externally screw-threaded, a two-part nut meshing with said screw-threads, each part being provided with a screw-threaded lug on one side, a right and left hand screw engaging with said lugs for opening and closing the nut upon the screw-threaded body, a movable cutter, and means whereby the traverse of the nut will move said cutter.

4. The combination with a tubular body externally screw-threaded, of a carriage adapted to slide along said body and having recessed jaws, a two-part nut meshing with the screw-threads and having its ends fitting the recesses in the carriage, means for opening and closing said nut upon the screw-threads, a movable cutter, and connections between said cutter and the carriage.

5. The combination with a tubular body externally screw-threaded, of a carriage adapted to slide along said body and having jaws provided with recesses having parallel walls, a two-part nut having projections on its ends fitting said recesses and slidable therein radially to said body, lugs on the two parts of the nut having right and left hand screw-threaded holes, a right and left hand screw engaging with said holes and rotating in a bearing in the carriage, a cutter movable transverse to the body, and connections between said cutter and the carriage.

6. The combination with a tubular body, of a carriage movable lengthwise thereon, a nut carried by said carriage and meshing with screw-threads on the body, said nut being made in two parts, means for opening and closing said nut, and a spring surrounding said body and adapted to return the carriage when it reaches the end of its travel and the nut has been opened.

7. In a pipe-cutting tool, the combination with a cutter, of a transversely-movable cutter-carrier provided with a hole, and a wedge adapted to be fed through said hole to move the carrier, said wedge having its upper side inclined, and its lower side parallel with its line of movement for a portion of its length and parallel with the upper inclined side for the rest of its length.

In testimony whereof I affix my signature in presence of two witnesses.

WILLIAM MILLER.

Witnesses:
J. A. HOUSTON,
TOM ARMSTRONG.